US010808375B2

(12) United States Patent
Claesson et al.

(10) Patent No.: US 10,808,375 B2
(45) Date of Patent: Oct. 20, 2020

(54) IMPLEMENT COUPLING DEVICE AND A MACHINE PROVIDED WITH SUCH A DEVICE (71) Applicant: HUSQVARNA AB, Huskvarna (SE)

(72) Inventors: Max Claesson, Landvetter (SE); Tommy Olsson, Mölndal (SE)

(73) Assignee: HUSQVARNA AB, Huskvarna (SE)

( * ) Notice: Subject to any disclaimer, the term of this patent is extended or adjusted under 35 U.S.C. 154(b) by 539 days.

(21) Appl. No.: 15/537,983

(22) PCT Filed: Nov. 27, 2015

(86) PCT No.: PCT/EP2015/077917
§ 371 (c)(1),
(2) Date: Jun. 20, 2017

(87) PCT Pub. No.: WO2016/102148
PCT Pub. Date: Jun. 30, 2016

(65) Prior Publication Data
US 2017/0350090 A1 Dec. 7, 2017

(30) Foreign Application Priority Data
Dec. 22, 2014 (SE) ..................... 1451626

(51) Int. Cl.
*E02F 3/36* (2006.01)
(52) U.S. Cl.
CPC ............ *E02F 3/364* (2013.01); *E02F 3/3618* (2013.01); *E02F 3/3636* (2013.01);
(Continued)
(58) Field of Classification Search
CPC ....... E02F 3/3636; E02F 3/364; E02F 3/3663; E02F 3/963; F16C 11/10;
(Continued)

(56) References Cited

U.S. PATENT DOCUMENTS 5,265,969 A * 11/1993 Chuang ................... F16C 11/10
403/93
6,658,770 B2 * 12/2003 Heiple .................. E02F 3/3636
37/468
(Continued)

FOREIGN PATENT DOCUMENTS

CA 2727324 A1 7/2012
CA 2731443 A1 8/2012
(Continued)

OTHER PUBLICATIONS

International Search Report and Written Opinion for International Application No. PCT/EP2015/077917 dated Jun. 10, 2016.
(Continued)

*Primary Examiner* — Josh Skroupa
(74) *Attorney, Agent, or Firm* — Burr & Forman, LLP (57) ABSTRACT An implement coupling device (1) on a working machine (2) comprises a coupling means (11) provided with a first shaft (21); an engagement means (12) provided with a second shaft (22) arranged parallel to the first shaft (21); at least one linkage (13, 14) comprising a first portion (23, 24) connected to the first shaft (21) and second portion (25, 26) connected to the second shaft (22), which first and second portions are connected by a pivot joint (27); and a wedge (28) means arranged to be removably mounted between the first and second portions (23, 24; 25, 26), wherein the coupling means (11) and the engagement means (12) are displaceable relative to each other in a direction at right angles to the first and second shafts (21, 22) to attach or release the implement. At least one portion (23, 24; 25, 26) making up a linkage (13, 14) is detachably fixed to its respective shaft (21, 22) by a locking means (31, 32, 33, 34) in a longitudinal recess (41, 42, 43, 44) at right angles to the
(Continued)

shaft (21, 22) and engaging with a tangential recess (51, 51', 51") in the outer surface of the shaft (21, 22).

19 Claims, 10 Drawing Sheets

(52) U.S. Cl.
CPC ..... *E02F 3/3663* (2013.01); *Y10T 403/32401* (2015.01); *Y10T 403/593* (2015.01); *Y10T 403/76* (2015.01)

(58) Field of Classification Search
CPC ..... Y10T 403/32254; Y10T 403/32262; Y10T 403/32271; Y10T 403/32327; Y10T 403/32336; Y10T 403/32344; Y10T 403/32361; Y10T 403/32377; Y10T 403/32401; Y10T 403/5793; Y10T 403/587; Y10T 403/591; Y10T 403/593; Y10T 403/598; Y10T 403/7051; Y10T 403/76
USPC ...... 403/83, 84, 85, 92, 93, 94, 96, 98, 101, 403/314, 319, 322.3, 367, 409.1
See application file for complete search history.

(56) References Cited

U.S. PATENT DOCUMENTS

| | | |
|---|---|---|
| 2003/0131505 A1 | 7/2003 | Heiple |
| 2008/0173457 A1 | 7/2008 | Kahra |
| 2011/0262212 A1 | 10/2011 | Luyendijk et al. |

FOREIGN PATENT DOCUMENTS

| | | | |
|---|---|---|---|
| CN | 102272386 A | 12/2011 | |
| DE | 10100449 A1 | 10/2001 | |
| DE | 102010018155 A1 | 11/2010 | |
| EP | 1024324 A2 | 8/2000 | |
| EP | 1316649 A1 | 6/2003 | |
| FR | 2545122 A1 * | 11/1984 | ............ E02F 9/2816 |
| WO | 9008234 A1 | 7/1990 | |
| WO | 2010103557 A1 | 9/2010 | |

OTHER PUBLICATIONS

International Preliminary Report on Patentability for International Application No. PCT/EP2015/077917 dated Jun. 27, 2017.

* cited by examiner

IMPLEMENT COUPLING DEVICE AND A MACHINE PROVIDED WITH SUCH A DEVICE

TECHNICAL FIELD

The invention relates to implement couplers used to secure attachments such as impact hammers, ripping tools, shears, etc. fixedly and operatively to the distal end of an arm of an arm-equipped construction machine.

BACKGROUND OF THE INVENTION

It is generally well known to use couplers, also referred to as "quick couplers," as for fixedly and operatively securing an attachment to the distal end of an arm which is, in turn, secured to a boom of a construction machine such as a backhoe or excavator.

Spread-style couplers are generally known. These couplers are connected to an arm by a connection at a first pivot point and are connected to a control link by a connection at a second pivot point. These prior couplers include first and second shafts that open in opposite directions oriented outwardly away from each other. In use, the shafts are collapsed toward each other and are placed between first and second hooks of an attachment and the shafts are then spread-apart from each other, using a screw jack, hydraulic cylinder or other means. Upon being spread sufficiently far apart, the shaft hook engages the first hook of the attachment and the second shaft engages the second hook of the attachment which results in the attachment being operatively connected to the arm.

In operation, couplers of this type are frequently subjected to vibrations and the component parts must be able to withstand such vibrations to ensure that the attached tool is securely fastened at all times. The shafts used for securing the implement are commonly fastened by means of a radial screw that extends through a holder into contact with the shaft in order to fix the shaft in position. A disadvantage with this solution is that the screw may work itself loose over time when subjected to vibrations. An alternative solution involves using a screw extending through the shaft and being fixed with a nut. A disadvantage with this solution is that the shaft is difficult to mount under adverse conditions and the through hole will also weaken the shaft.

The object of the invention is to provide an improved Implement coupling device that solves the above problems.

INVENTION

The above problems have been solved by an implement coupling device as claimed in the appended claims.

According to a preferred embodiment, the invention relates to an implement coupling device on a working machine. The device comprises a coupling means provided with a first shaft; an engagement means provided with a second shaft arranged parallel to the first shaft; at least one linkage comprising a first portion connected to the first shaft and a second portion connected to the second shaft, which first and second portions are connected by a pivot joint; and a wedge means arranged to be removably mounted between the first and second portions, which wedge means is fixed in position to prevent relative movement of the first and second portions when an implement is attached to the coupling device. The coupling means and the engagement means are displaceable relative to each other in a direction at right angles to the first and second shafts to attach or release the implement. At least one portion making up a linkage is detachably fixed to its respective shaft by a locking means in a longitudinal recess at right angles to the shaft and engaging with a tangential recess in the outer surface of the shaft.

According to one example, the coupling means comprises two parallel linkages, each comprising a first portion connected to the first shaft and a second portion connected to the second shaft. One or both of the first and second portions making up a linkage can be detachably fixed to its respective shaft by a locking means. Each shaft can be fixed by multiple, axially separated locking means.

The longitudinal recess is located in the linkage portion, wherein at least a portion of the locking means intersects the shaft. The recess can be located in either or in both of the first and second linkage portions.

According to one example, at least a third of the cross-sectional area of the locking means intersects the shaft at the point where a radius of the shaft intersects the main direction of the locking means. According to a further example, at least half the cross-sectional area of the locking means intersects the shaft. The intersecting cross-sectional area of the locking means is measured at the point where a radius of the shaft intersects the main direction of the locking means at right angles. The tangential recess can comprise a tangential slot in the shaft. Alternatively, the recess can be circumferential recess having a cross-section matching a corresponding locking means. This is advantageous as the shafts are only required to be positioned axially during the insertion of the locking means. Preferably, the contacting portions of the locking means and the tangential recess have mating or substantially mating shapes. The locking means can have a rectangular, part-circular, oval or a circular cross-section.

Examples of suitable locking means are screws, preferably an Allen screw, or similar threaded fasteners with or without a nut, which fasteners can be unscrewed for servicing. An advantage with threaded fasteners is that the cross-section can be varied along the extension thereof, whereby a screw can have a front threaded section, for fastening, and a central cylindrical section for contacting the shaft. When tightening the screw, the central section can be pre-tensioned to make it less prone to working itself loose when subjected to vibrations during operation of the attached tool.

Alternative locking means can be a bolt or a pin, such as a taper pin, dowel pin or similar, which is inserted with a force fit. Further alternatives can include a slotted or coiled spring lock pin, which deforms resiliently when inserted. The latter examples require a longitudinal recess open at both ends to allow for removal of the locking means.

The tangential recess can be a datum point determining the axial projection of the shaft relative to the linkage portion. By ensuring that the locking means and the tangential recess have at least substantially mating shapes, the axial projections of the shaft cooperating with hooks on an implement are automatically determined when the shafts are mounted.

According to one advantageous example, both ends of the locking means extend into the linkage portion. In this way the ends of the locking means are out of contact with the shaft on either side of its shaft contacting portion. When the locking means is a screw, this arrangement allows the head of the screw and the threaded portion of the screw to be located in the linkage portion on opposite sides of a central the shaft contacting section. This central section can be pre-tensioned prevent it from working itself loose when subjected to vibrations as indicated above.

The locking means can be arranged within the outer envelope of the linkage portion adjacent one or both ends of the longitudinal recess. This can be achieved by countersinking one end of the tangential recess receiving the locking means, e.g. the head of a screw, into the surface of the linkage portion. The opposite end of the tangential recess can be a blind hole or a through hole, wherein the length of the locking means is selected accordingly.

According to a further example the wedge means that is arranged to prevent relative movement of the first and second portions of the linkage is provided with a guide means. The wedge means can be inserted into a slot created by a pair of facing recesses between the first and second portions to lock the linkages in position. The guide means can comprise a suitable profiled section extending in the direction of insertion of the wedge means and/or parallel to the axes of the shafts. The profiled section can, for instance, comprise a longitudinal enlarged portion having a greater thickness than the remaining portion of the wedge means or a longitudinal groove with a suitable cross-section. The profiled section making up the guide means can have a substantially rectangular, V-shaped or rounded cross-section. The profiled section is preferably located in or on the main outer surfaces of the wedge means which surfaces are parallel to a plane through the axes of the first and second shafts.

An alternative location of the profiled section is along at least one of the longitudinal side edges joining the main surfaces of the wedge means. Alternatively one or both the main outer surfaces of the wedge means can be located in a plane at an angle to a plane through the axes of the first and second shafts, wherein the at least one angled main surface acts as a guide means.

At least one guide means of either type can be provided on one or on both sides of the wedge means and cooperates with mating guide surfaces in the slot created by facing recesses between the first and second portions of the linkage.

According to a further example the openings receiving a shaft can be provided with an open radial slot extending from the inner surface of the respective opening to the outer surface of each linkage portion. Each radial slot is preferably, but not necessarily, arranged to intersect its corresponding locking means at right angles to the axes of said locking means. As the locking means are tightened this arrangement provides a clamp connection in addition to the positioning function of the locking means The invention further relates to a working machine comprising an implement coupling device according to the above-mentioned examples and to an implement coupling device with a wedge means as described above.

FIGURES

In the following text, the invention will be described in detail with reference to the attached drawings. These schematic drawings are used for illustration only and do not in any way limit the scope of the invention. In the drawings.

DETAILED DESCRIPTION

Figure 1:
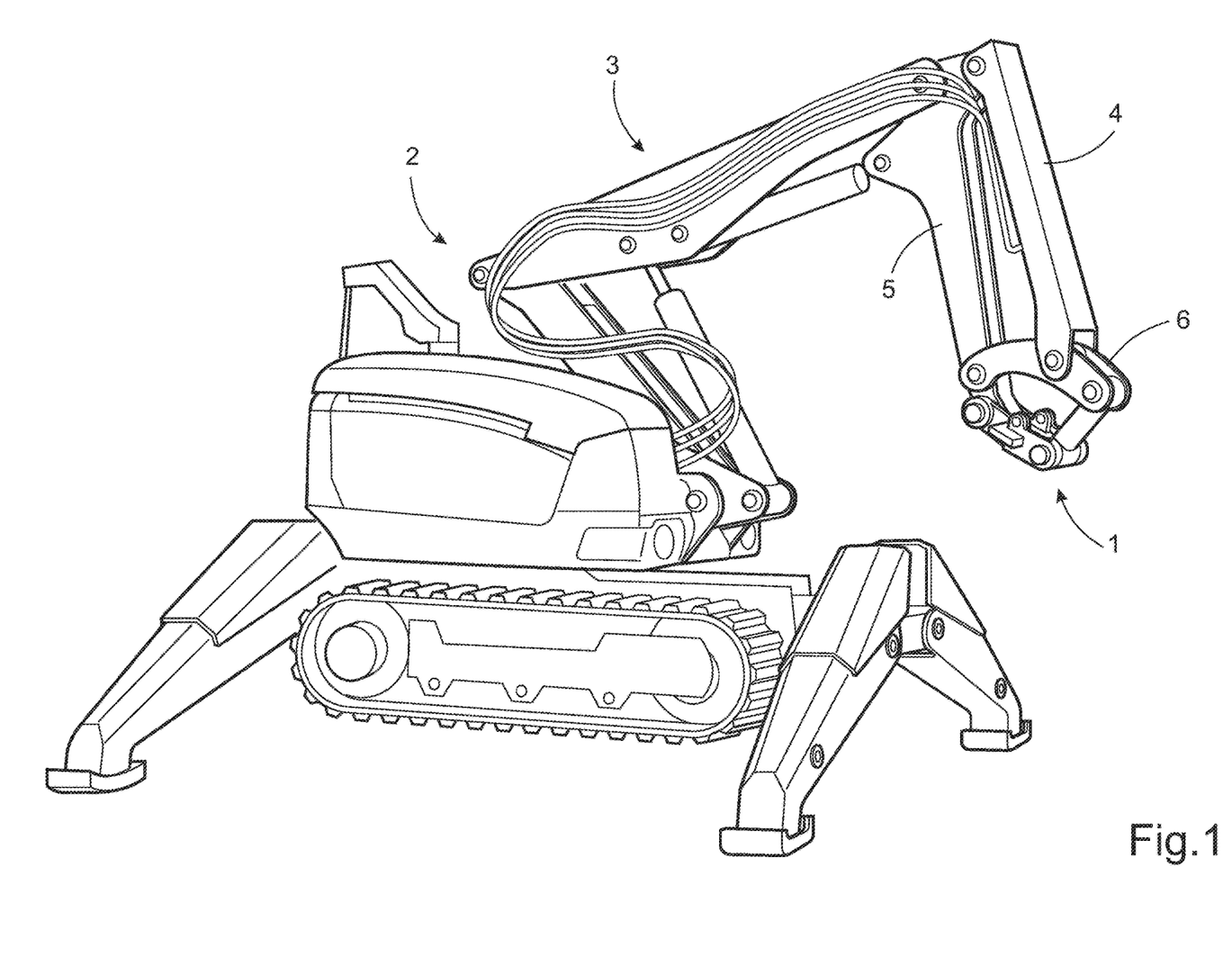
FIG. 1 shows a schematically indicated working machine for use with an implement coupling device according to the invention.

FIG. 1 shows a schematically indicated working machine 2 for use with an implement coupling device 1 according to the invention. The implement coupling device 1 is intended for operatively securing an implement (not shown) to the distal end of an arm 4, 5 which is, in turn, secured to a boom 3 on the working machine 2. The arm 4, 5 comprises an upper arm 4 and lower arm 5 which arms are connected to a swinging link 6 at the distal end of the arm adjacent the implement coupling device 1. The upper arm 4 and the lower arm 5can be displaced relative to each other by means of hydraulic cylinders (not shown) in order to displace the link 6 and control the implement coupling device 1 to attach and release an implement.

Figure 2:
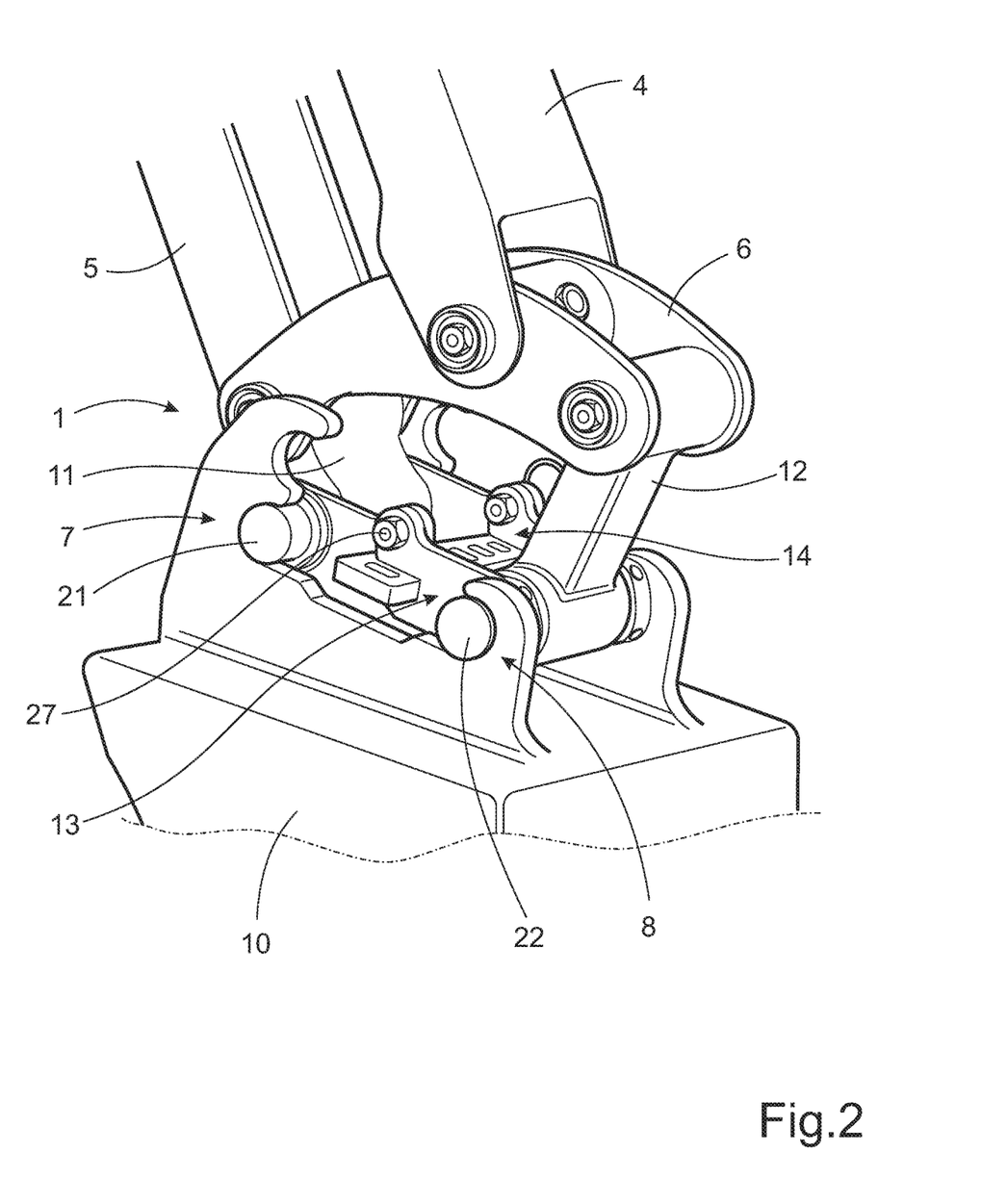
FIG. 2 shows a schematic perspective view of an implement coupling device according to the invention.

FIG. 2 shows a schematic perspective view of an implement coupling device 1 according to the invention. The implement coupling device 1 comprises a coupling means 11 provided with a first shaft 21, which shaft 21 connects the implement coupling device 1 to the lower arm 5 of the working machine. The implement coupling device 1 further comprises an engagement means 12 provided with a second shaft 22 arranged parallel to the first shaft 21. The coupling means 11 and the engagement means 12 are displaceable relative to each other in a direction at right angles to the axes of the first and second shafts 21, 22 to attach or release an implement. The engagement means 12 is connected to the first shaft 21 at a first end and to a free end of the link 6 attached to the upper arm 4 and the lower arm 5 at a second end. The outer ends of the first shaft 21 are arranged to cooperate with a pair of first hooks 7 (one indicated) on opposite sides of an implement 10. Similarly, the outer ends of the second shaft 22 are arranged to cooperate with a pair of second hooks 8 (one indicated) facing the said first hooks 7. Displacement of the upper arm 4 relative to the lower arm 5 in the direction of the implement will cause the link 6 to swing and displace the engagement means 12 so that the second shaft 22 moves out of contact with the second hooks 8 and towards the first shaft 21. Subsequently the lower arm 4 is maneuvered to move the first shaft 21 out of contact with the first hooks 7 and the implement coupling device 1 is disconnected from the implement. Attachment of a new implement is carried out in reverse.

Figure 3A:
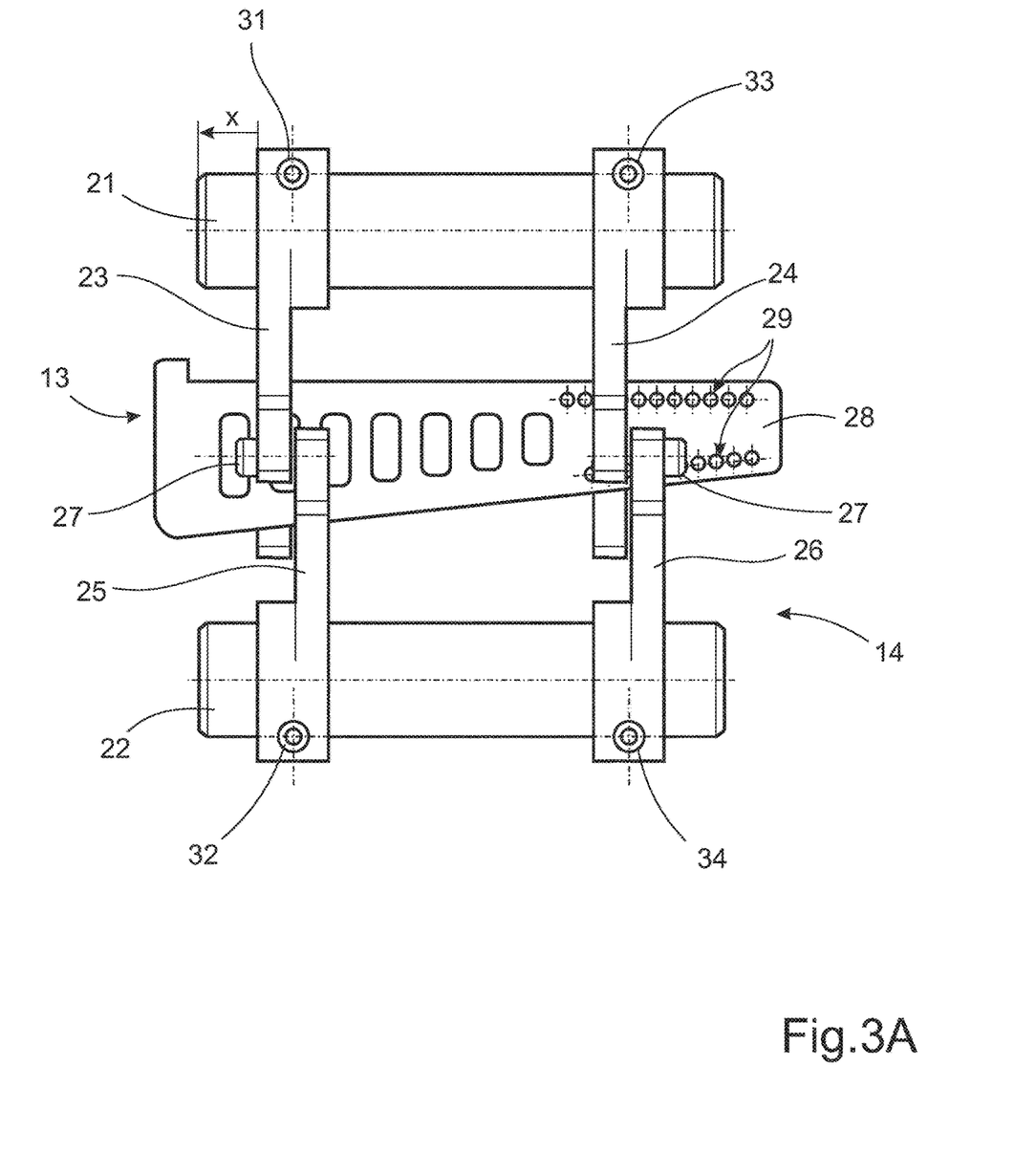
FIGS. 3A-B show alternative schematic plan views of implement coupling devices according to the invention.

In order to lock the first and second shafts 21, 22 in position after the attachment of an implement, the implement coupling device 1 is provided with a pair of linkages 13, 14 each comprising a first portion 23, 24, connected to the first shaft 21, and a second portion 25, 26, connected to the second shaft 22, as shown in FIG. 3A. The first portions 23, 24 each are detachably fixable to the first shaft 21 by respective first locking means 31, 33. The second portions 25, 26 each is detachably fixable to the second shaft 22 by respective second locking means 32, 34. The first- and second locking means are each receivable in a respective longitudinal recess 41, 42, 43, 44; 45 (FIG. 6a-b) of the linkage portions and engageable with axially separated tangential recesses 51; 51'; 51" (FIG. 7a-c) in the outer surface of the first- and the second shaft. The first and second portions 23, 24; 25, 26 are each connected by a pivot joint 27. The central axis of the pivot joints 27 is parallel to the first and second shafts 21, 22 and is located separate from a plane through the central axes of the first and second shafts 21, 22. In the example shown in FIG. 2, the central axis of the pivot joints 27 is located between the said plane and the end of the link 6, allowing the linkage portions 23, 24; 25, 26 to be angled upwards when the distance between the first and second shafts 21, 22 is reduced during the disconnection of an implement.

In FIG. 2 the linkage portions 23, 24; 25, 26 are located substantially in line when the second shaft 22 is forced into contact with the second hooks 8 to attach the implement 10. The linkages 13, 14 are locked in position by a wedge means 28 arranged to be removably mounted between the respective first and second portions 23, 24; 25, 26. The wedge means is inserted into a slot between the first and second portions 23, 24; 25, 26 and fixed in position (see FIG. 3A) to prevent relative movement of the first and second portions 23, 24; 25, 26 when an implement is attached to the coupling device 1.

FIG. 3A shows a first alternative schematic plan view of an implement coupling device 1 as shown in FIG. 2. In FIG. 3A the linkage portions 23, 24; 25, 26 are located substantially in line and the linkages 13, 14 are locked in position by a wedge means 28 arranged to be removably mounted between the respective first and second portions 23, 24; 25, 26. The wedge means 28 is inserted into a slot created by a pair of facing recesses (not shown) between the first and second portions 23, 24; 25, 26 and fixed in position (see FIG. 3A). The wedge means 28 is locked in position by a spring pin (see FIG. 4A) inserted into one of multiple holes 29 through the wedge means 28. As shown in FIG. 3A, the holes are arranged along opposing edges of the narrowest end of the wedge means 28, which respective opposing sets of holes are offset by half the distance between two adjacent holes in the longitudinal direction of the wedge means 28.

FIG. 3A further shows how each linkage portion 23, 24; 25, 26 making up a linkage 13, 14 is detachably fixed to its first and second shaft 21, 22, respectively, by a locking means 31, 32, 33, 34. In this example the locking means are screws, preferably Allen screws, but the invention is not limited to this example. Each shaft 21, 22 can be locked in position by multiple, axially separated locking means 31, 32, 33, 34; the example shown in FIG. 3A uses two locking means 31, 32, 33, 34. Each locking means 31, 32, 33, 34 is located in a longitudinal recess (see FIGS. 5A-5C) in the respective linkage portion 23, 24; 25, 26, wherein at least a portion of the locking means 31, 32, 33, 34 intersects the shaft 21, 22. Each locking means 31, 32, 33, 34 is arranged to cooperate with a corresponding tangential recess (see FIGS. 7A-7C) in the outer surfaces of the first and second shaft 21, 22. The locking means and the tangential recesses have at least substantially mating shapes. For example, a cylindrical locking means can be matched by a part-cylindrical recess in the shaft. In this context, a circumferential recess (see FIG. 7A) is preferable, as the shafts are only required to be positioned axially during the insertion of the locking means. In this way the axial projection x of the ends of the first and second shafts 21, 22 from a side surface of the respective linkage portion 23, 24; 25, 26 can be defined with a predetermined desired accuracy. The axial projection x of the ends of the first and second shafts 21, 22 is substantially equal to the thickness of the cooperating hooks 7, 8 on the attached implement. This feature can be used for, e.g. ensuring that the ends of the shafts do not protrude outside the hooks on the implement in order to protect the shafts during operation of the implement.

Figure 4A:
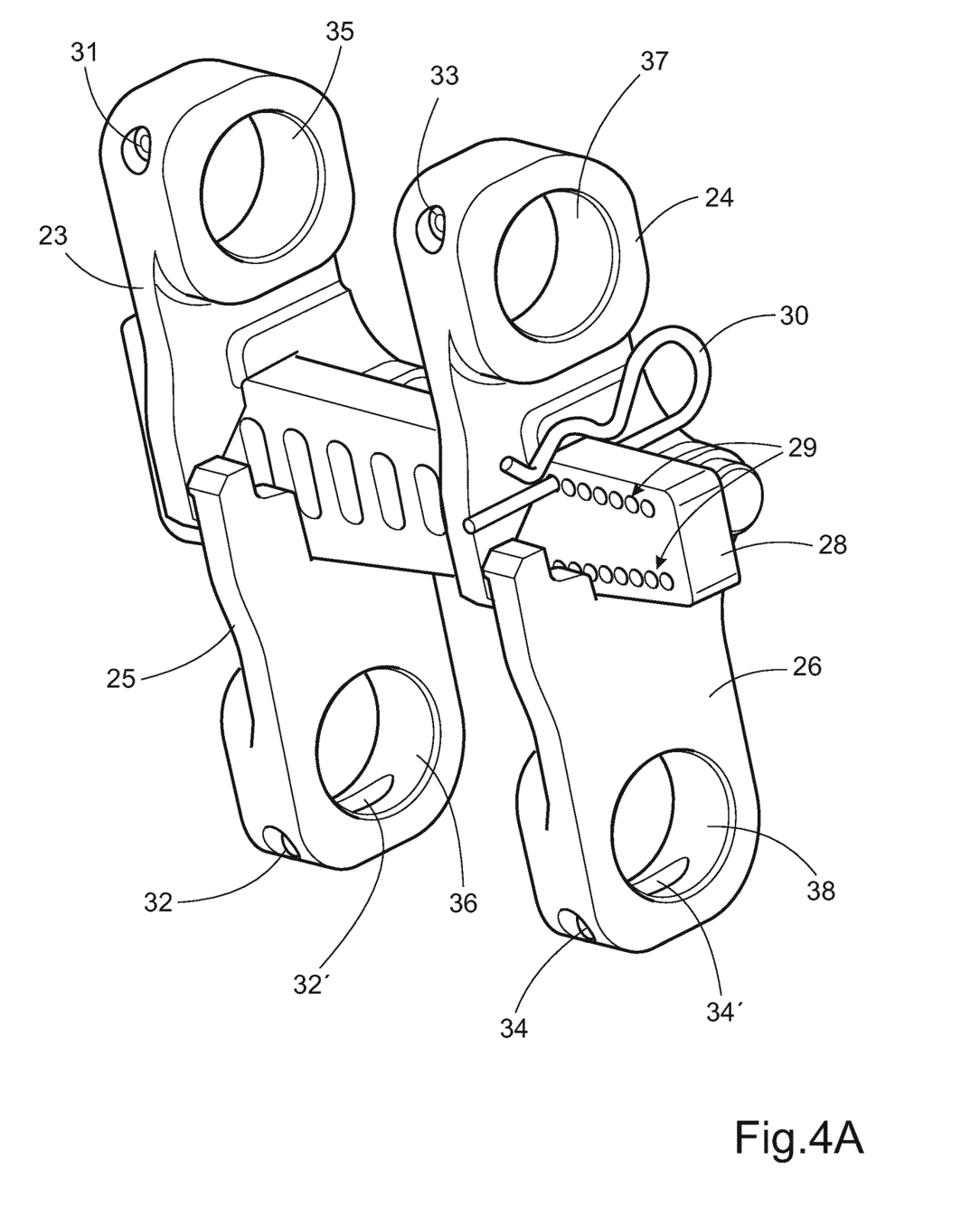
FIGS. 4A-B shows alternative schematic perspective views of linkages in an implement coupling device according to the invention.

FIG. 4A shows a schematic perspective view of a linkage in an implement coupling device 1 according to the invention. FIG. 4A shows the linkage in FIG. 3A from below, indicating the linkage portions 23, 24; 25, 26 making up a linkage 13, 14 with the first and second shafts 21, 22 removed. The wedge means 28 inserted between the linkage portions 23, 24; 25, 26 is locked in position by a spring pin 30 inserted into one of multiple holes 29 through the wedge means 28. The linkage portions 23, 24; 25, 26 have openings 35, 36; 37, 38 for the first and second shafts and locking means 31, 32, 33, 34 arranged to intersect these openings 35, 36; 37, 38. The central portion 32', 34' of two locking means 32, 34 can be seen protruding into their respective opening 36, 38 in FIG. 4A. Preferably, at said openings 35, 36; 37, 38, at least a part of each of the linkage portions 23, 24; 25, 26 completely surrounds the respective shaft.

Figure 3B:
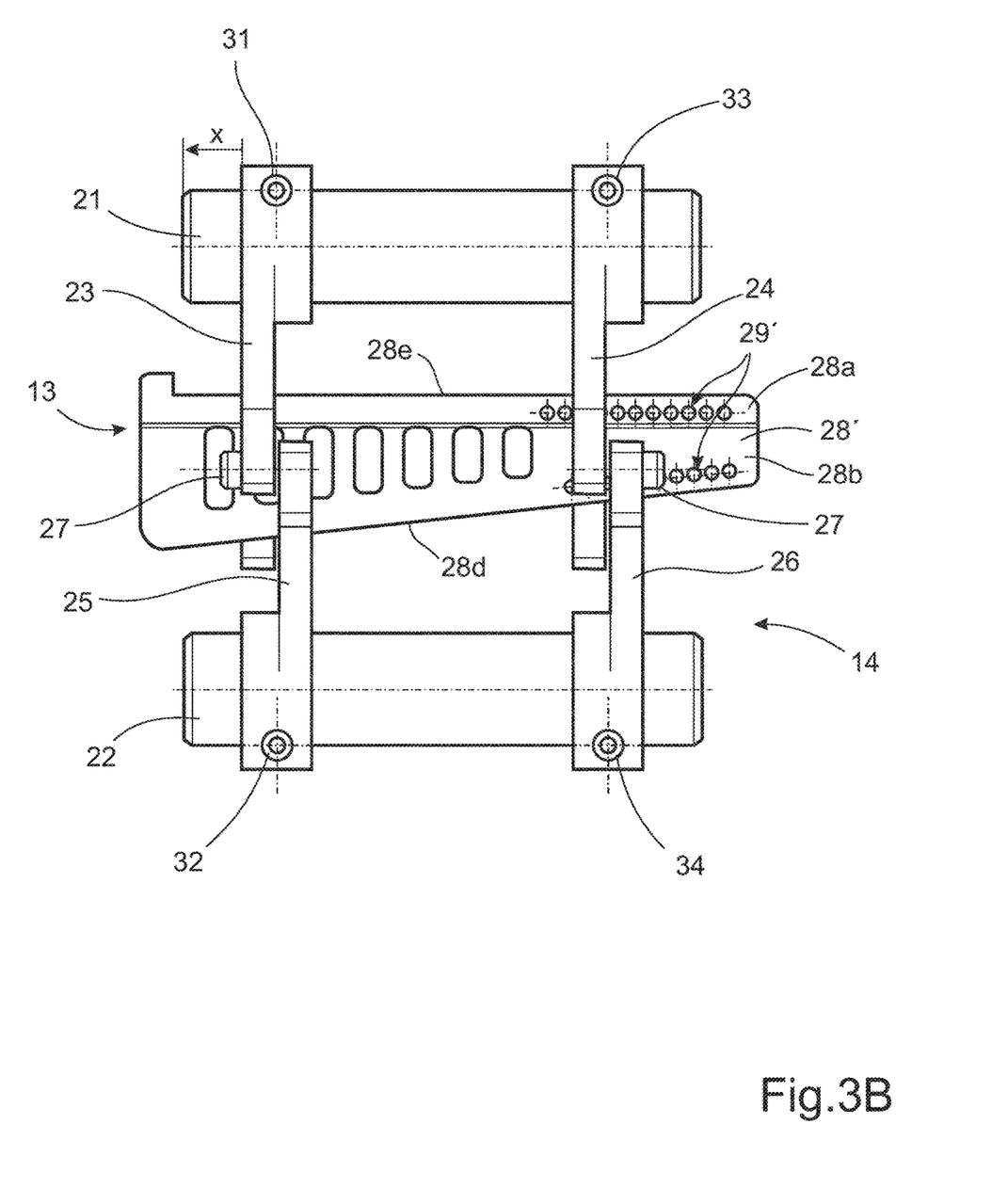
Figure 3C:
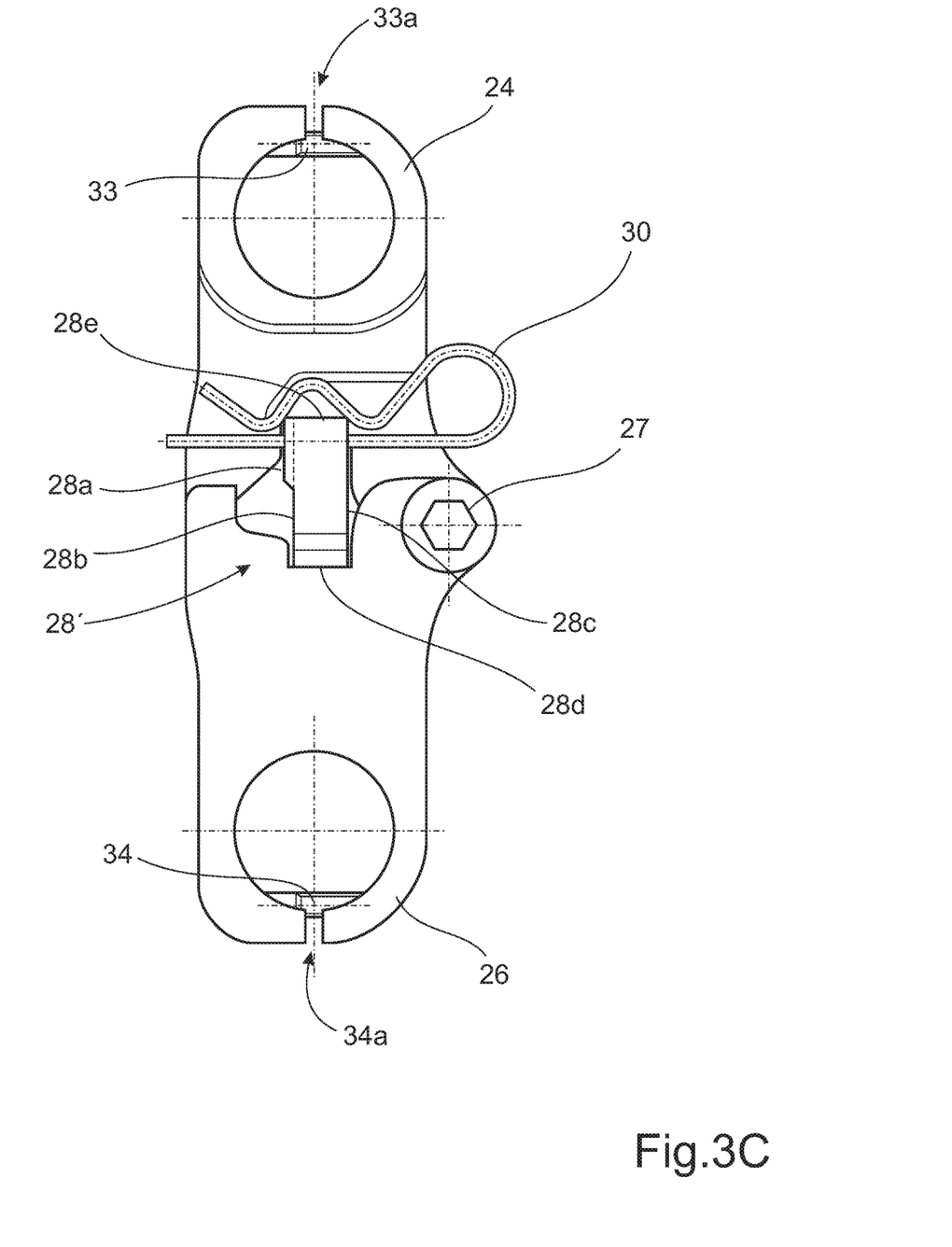
FIG. 3C shows a schematic side view of the implement coupling device in FIG. 3B.

FIG. 3B shows a second alternative schematic plan view of an implement coupling device 1 as shown in FIG. 2. FIG. 3C shows a schematic side view of the implement coupling device in FIG. 3B. In FIG. 3B the same reference numbers will be used for the same component parts. Consequently FIG. 3B shows linkage portions 23, 24; 25, 26 located substantially in line, wherein the linkages 13, 14 are locked in position by an alternative wedge means 28' arranged to be removably mounted between the respective first and second portions 23, 24; 25, 26. The alternative wedge means 28' differs from the wedge means 28 in FIG. 3A in that it is provided with a guide means 28a. The guide means 28a comprises a portion of a main outer surface of the wedge means 28' extending in the direction of insertion of the wedge means 28' and parallel to the shafts 21, 22. The wedge means 28' is inserted into a slot created by a pair of facing recesses (see FIG. 3C) between the first and second portions 23, 24; 25, 26 and is locked in position as described in connection with FIG. 2 above. The guide means 28a has profiled section having a greater thickness than the remaining portion 28b of the wedge means 28' and cooperates with a portion of the slot having a corresponding width. This arrangement ensures that the wedge means is inserted in a desired orientation, as the guide means prevents the wedge means 28' from being inserted upside down or from the wrong direction. FIGS. 3B and 3C only illustrates one possible guide means having a substantially rectangular cross-section. Alternatively the profiled section can comprise a longitudinal enlarged portion having a V-shaped or rounded cross-section. A further alternative includes a longitudinal groove with a suitable rectangular, V-shaped or rounded cross-section.

The profiled section is preferably located in or on the main outer surfaces 28a, 28b, 28c of the wedge means 28' which surfaces are parallel to a plane through the axes of the first and second shafts 21, 22. An alternative location of the profiled section is along at least one of the elongated side edges 28d, 28e joining the main surfaces 28a, 28b, 28c of the wedge means 28'.

At least one guide means of either type can be provided on one or on both sides (28a, 28b; 28c) of the wedge means and is arranged to cooperate with matching guide surfaces in the slot created by facing recesses between the first and second portions of the linkage.

The wedge means 28' is locked in position by a spring pin 30 (see FIG. 4B) inserted into one of multiple holes 29' through the wedge means 28'. As shown in FIG. 3B, the holes are arranged along opposing edges of the narrowest end of the wedge means 28', which respective opposing sets of holes are offset by half the distance between two adjacent holes in the longitudinal direction of the wedge means 28'.

Figure 5A:
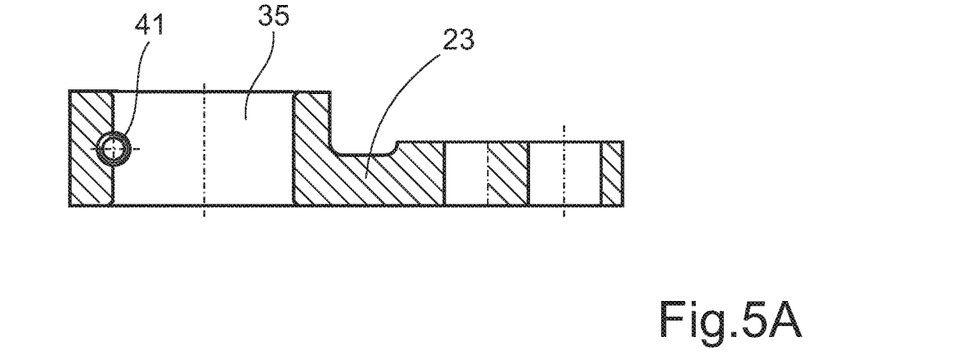
FIGS. 5A-C show alternative exemplary schematic cross-sections through a linkage portion in FIG. 4A.
Figure 5B:
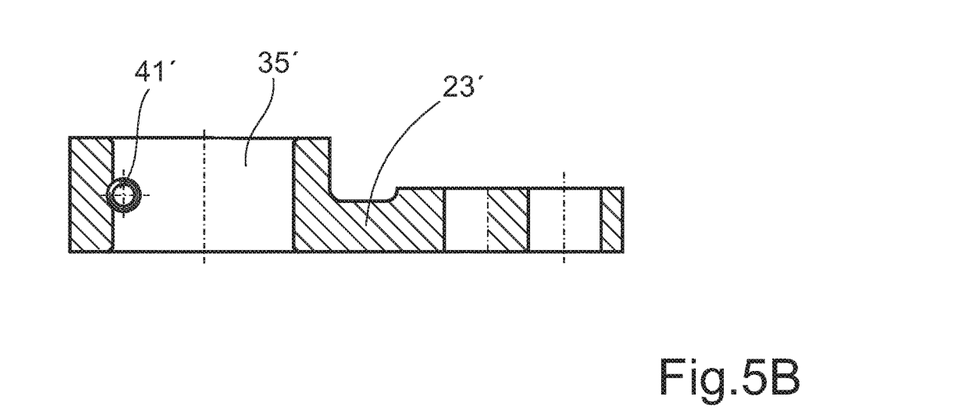
Figure 5C:
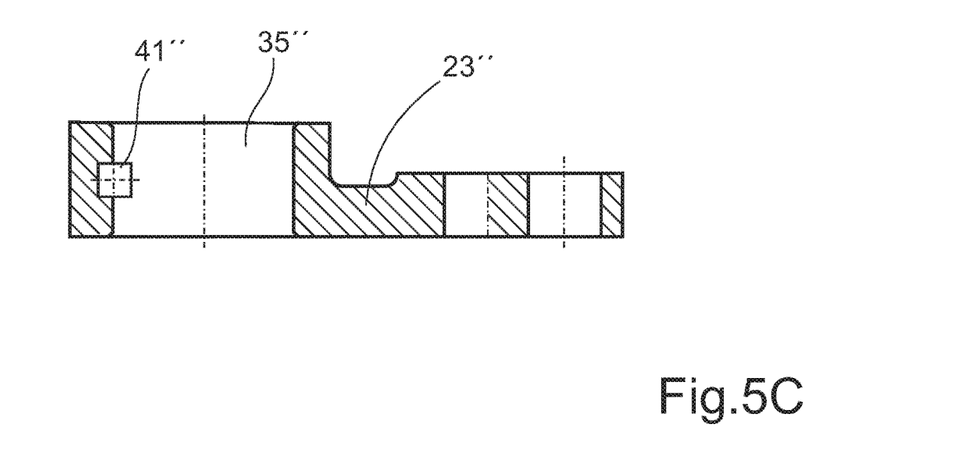

FIG. 3B further shows how each linkage portion 23, 24; 25, 26 making up a linkage 13, 14 is detachably fixed to its first and second shaft 21, 22, respectively, by a locking means 31, 32, 33, 34. In this example the locking means are screws, preferably Allen screws, but the invention is not limited to this example. Each shaft 21, 22 can be locked in position by multiple, axially separated locking means 31, 32, 33, 34; the example shown in FIG. 3A uses two locking means 31, 32, 33, 34. Each locking means 31, 32, 33, 34 is located in a longitudinal recess (as indicated in FIGS. 5A-5C) in the respective linkage portion 23, 24; 25, 26, wherein at least a portion of the locking means 31, 32, 33, 34 intersects the shaft 21, 22. Each locking means 31, 32, 33, 34 is arranged to cooperate with a corresponding tangential recess (see FIGS. 7A-7C) in the outer surfaces of the first and second shaft 21, 22. The locking means and the tangential recesses have at least substantially mating shapes. For example, a cylindrical locking means can be matched by a part-cylindrical recess in the shaft. In this context, a circumferential recess (see FIG. 7A) is preferable, as the shafts are only required to be positioned axially during the insertion of the locking means. In this way the axial projection x of the ends of the first and second shafts 21, 22 from a side surface of the respective linkage portion 23, 24; 25, 26 can be defined with a predetermined desired accuracy. The axial projection x of the ends of the first and second shafts 21, 22 is substantially equal to the thickness of the cooperating hooks 7, 8 on the attached implement. This feature can be used for, e.g. ensuring that the ends of the shafts do not protrude outside the hooks on the implement in order to protect the shafts during operation of the implement.

A further difference relates to the openings 35', 36'; 37', 38' in each of the linkage portions 23, 24; 25, 26 which surrounds the respective shaft 21, 22. This difference will be discussed in connection with FIG. 4B below.

Figure 4B:
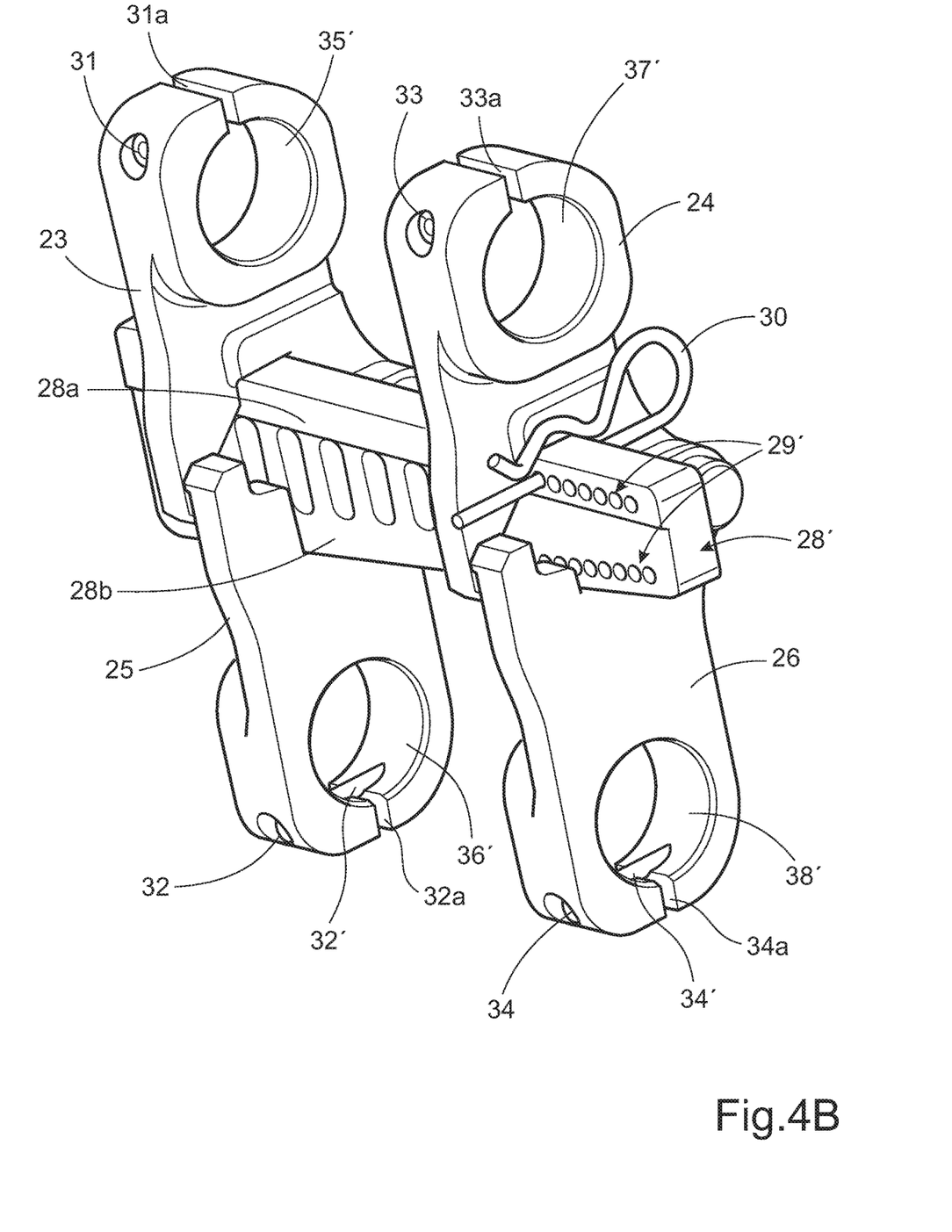

FIG. 4B shows a schematic perspective view of a linkage in an implement coupling device 1 according to the invention. FIG. 4B shows the linkage in FIG. 3B from below, indicating the linkage portions 23, 24; 25, 26 making up a linkage 13, 14 with the first and second shafts 21, 22 removed. The wedge means 28 inserted between the linkage portions 23, 24; 25, 26 is locked in position by a spring pin 30 inserted into one of multiple holes 29 through the wedge means 28. The linkage portions 23, 24; 25, 26 have openings 35', 36'; 37', 38' for the first and second shafts 21, 22 and locking means 31, 32, 33, 34 arranged to intersect these openings 35, 36; 37, 38. The central portion 32', 34' of two locking means 32, 34 can be seen protruding into their respective opening 36, 38 in FIG. 4B. Preferably, at said openings 35', 36'; 37', 38', at least a part of each of the linkage portions 23, 24; 25, 26 completely surrounds the respective shaft.

As can be seen from FIG. 4B, each opening 35', 36'; 37', 38' is provided with a radial slot 35a, 36a; 37a, 38a extending from the inner surface of the respective opening 35', 36'; 37', 38' to the outer surface of each linkage portion 23, 24; 25, 26. As can be seen in FIG. 3C, each radial slot 35a, 36a; 37a, 38a intersects its corresponding locking means 31, 32, 33, 34 at right angles to the axes of said locking means 31, 32, 33, 34. As the locking means 31, 32, 33, 34 are tightened this arrangement provides a clamp connection in addition to the positioning function of the locking means 31, 32, 33, 34. One advantage with this arrangement is that the clamp connection will assist in preventing movement of the first and second shafts 21, 22.

A further advantage is that the clamp connection will allow shafts 21, 22 with larger tolerances to be used, as any undesirable slack between the shafts and the locking means and/or the opening can be eliminated by tightening the clamp connection.

FIG. 5A-C show alternative exemplary schematic cross-sections taken in the longitudinal direction through a linkage portion in FIG. 4A. FIG. 5A shows a first example wherein a linkage portion 23 is provided with an opening 35 for a shaft (not shown). A longitudinal recess 41 is arranged in the linkage portion 23 extending at a tangent to and partially into the opening 35. The example in FIG. 5A shows a circular longitudinal recess 41 where half of the cross-sectional area of the longitudinal recess 41 intersects the opening 35 at the point where a radius of the opening 35 intersects the main direction of the longitudinal recess 41.

FIG. 5B shows a second example wherein a linkage portion 23' is provided with an opening 35' for a shaft (not shown). A longitudinal recess 41' is arranged in the linkage portion 23' extending at a tangent to and partially into the opening 35'. The example in FIG. 5B shows a circular longitudinal recess 41' where two thirds of the cross-sectional area of the longitudinal recess 41' intersects the opening 35' at the point where a radius of the opening 35' intersects the main direction of the longitudinal recess 41'.

FIG. 5C shows a third example wherein a linkage portion 23" is provided with an opening 35" for a shaft (not shown). A longitudinal recess 41" is arranged in the linkage portion 23" extending at a tangent to and partially into the opening 35". The example in FIG. 5C shows a square longitudinal recess 41" where half of the cross-sectional area of the longitudinal recess 41" intersects the opening 35" at the point where a radius of the opening 35" intersects the main direction of the longitudinal recess 41".

Figure 6A:
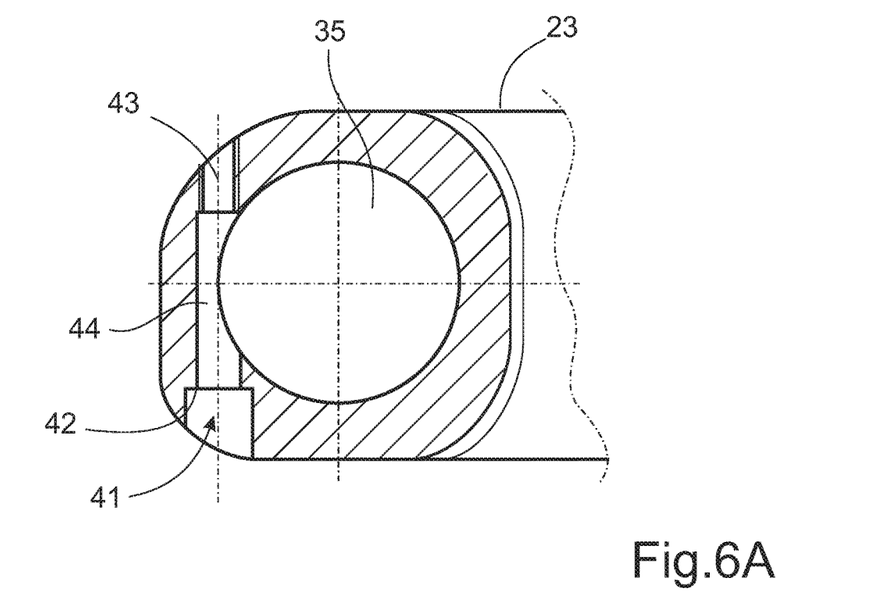
FIGS. 6A-B show alternative exemplary schematic cross-sections through the linkage portions in FIGS. 5A & 5B.
Figure 6B:
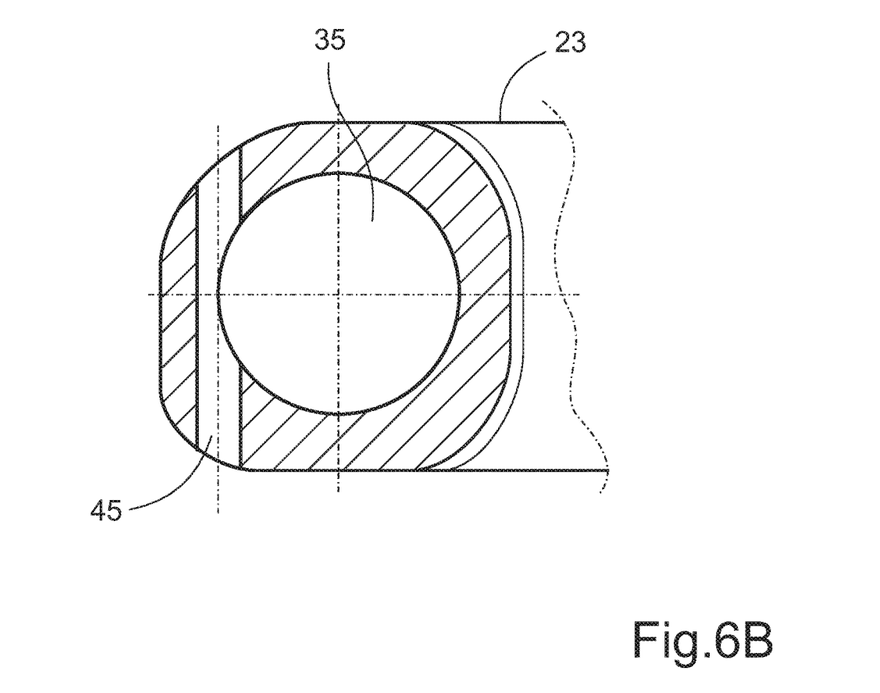

The recesses indicated in FIGS. 5A-C are also applicable to the embodiment in FIG. 4B. FIG. 6A-B show alternative exemplary schematic cross-sections taken in the longitudinal direction of a recess the linkage portion in FIG. 5A. FIG. 6A shows a first example wherein a linkage portion 23 is provided with an opening 35 for a shaft (not shown). A longitudinal recess 41 is arranged in the linkage portion 23 extending at a tangent to and partially into the opening 35. The longitudinal recess 41 in this example is intended for a screw, e.g. an Allen screw, and comprises a first section 42 that is countersunk to allow the head of the screw to be located within the outer envelope surface of the linkage 23. The longitudinal recess 41 further comprises a second section 43 that is threaded for cooperation with a corresponding threaded section of a screw. Preferably, the longitudinal recess is a through-recess extending between two separate openings at the outer envelope of the linkage portion 23, a first opening at the first section 42 and a second opening at the second section 43. Using a through-recess has a number of advantages, both during manufacturing and during use. For instance, when drilling and cutting threads, machined cuttings can be cleared out more easily. During use, any debris clogging the through-recess during servicing can be cleared out by the operator without difficulty. Preferably, the end of the screw should not extend out of the second section 43, but remain within the outer envelope surface of the linkage 23. The longitudinal recess 41 further comprises an intermediate, third section 44 which can be threaded or non-threaded. In this example the third section 44 is not threaded and has the same diameter as the central portion of the corresponding screw, preferably with a loose fit to facilitate mounting of the screw and the shaft. The example in FIG. 6A shows a circular longitudinal recess 41 where half of the cross-sectional area of the intermediate, third section 44 intersects the opening 35 at the point where a radius of the opening 35 intersects the main direction of the longitudinal recess 41.

FIG. 6B shows a second example wherein a linkage portion 23 is provided with an opening 35 for a shaft (not shown). A longitudinal recess 45 is arranged in the linkage portion 23 extending at a tangent to and partially into the opening 35. The longitudinal recess 45 in this example is intended for cooperation with a conical pin. Preferably, the longitudinal recess 45 is a through-recess extending between two separate openings at the outer envelope of the linkage portion 23. Preferably, the ends of the pin when mounted should not extend out of the longitudinal recess 45, but remain within the outer envelope surface of the linkage 23. In this example the longitudinal recess 45 has the same diameter as the larger portion of the conical pin, preferably with a force fit to facilitate mounting of the pin and the shaft. The example in FIG. 6B shows a circular longitudinal recess 45 where half of the cross-sectional area of the intermediate, third section 44 intersects the opening 35 at the point where a radius of the opening 35 intersects the main direction of the longitudinal recess 45.

Figure 7A:
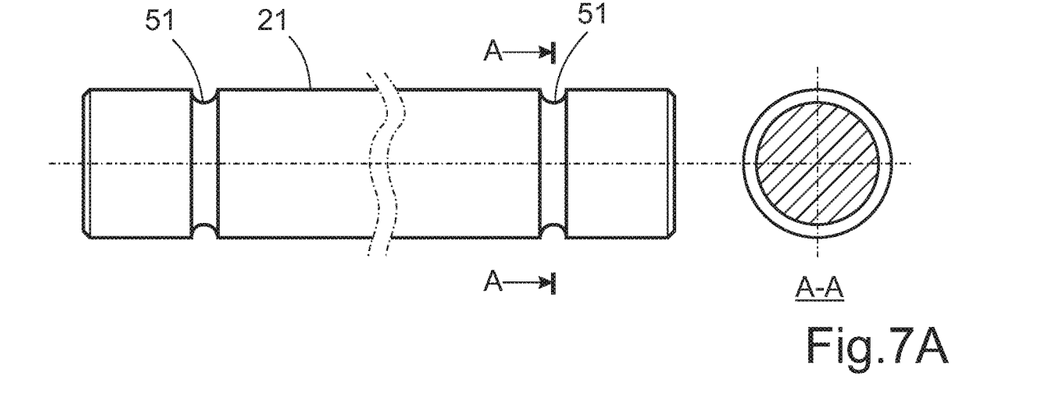
FIG. 7A-C show alternative exemplary schematic views of shafts for the devices shown in FIGS. 3A and 3B.
Figure 7B:
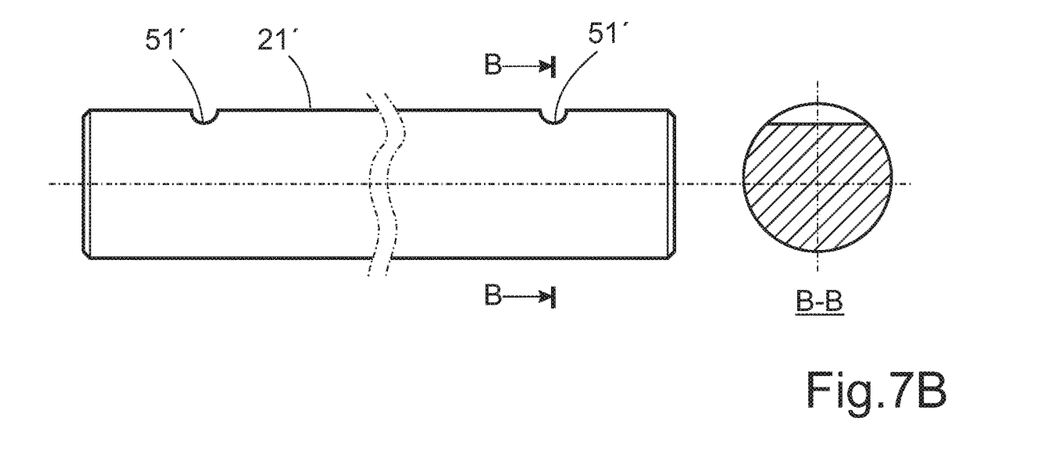
Figure 7C:
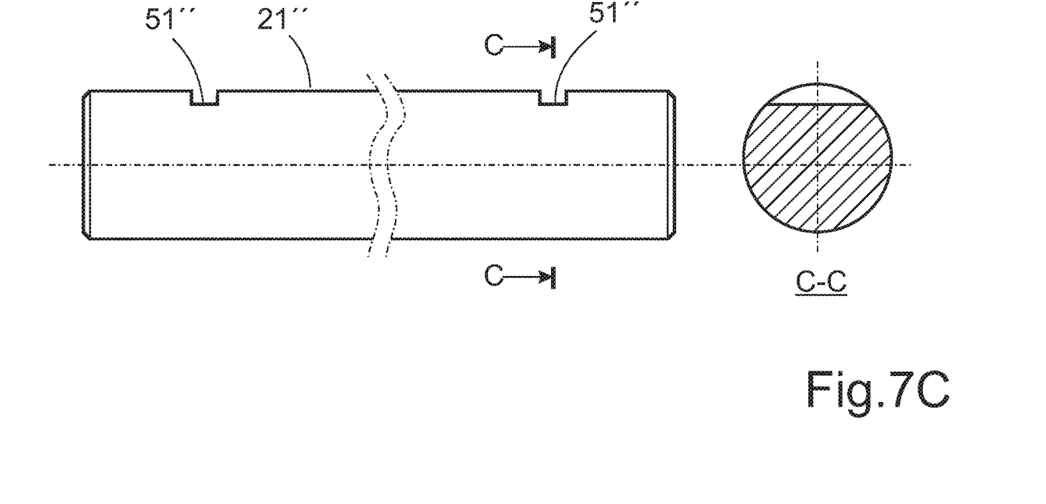

The recesses indicated in FIGS. 6A-C are also applicable to the embodiment in FIG. 4B. FIG. 7A-C show alternative exemplary schematic plan views of a shaft from FIGS. 3A-B. FIG. 7A shows a first example wherein the shaft 21 is provided with a circumferential radial groove 51, as indicated by the cross-section A-A. Preferably, the groove 51 has a constant depth. The circumferential radial groove 51 in this example has depth corresponding to half of the cross-sectional area of a locking means (see FIGS. 3A, 3B & 5A) intersecting the shaft 21 at a point where a radius of the shaft 21 intersects the main direction of the tangential locking means. When mounting a shaft a shown in FIG. 7A, it is only required to position the shaft in the axial direction in order to allow the locking means to be inserted.

FIG. 7B shows a second example wherein the shaft 21 is provided with a tangential semi-circular slot 51', as indicated by the cross-section B-B. The tangential slot 51' in this example has depth corresponding to half of the cross-sectional area of a locking means (see FIGS. 3A, 3B & 5A) with a circular cross-section intersecting the shaft 21 at a point where a radius of the shaft 21 intersects the main direction of the tangential locking means.

FIG. 7C shows a third example wherein the shaft 21 is provided with a tangential rectangular slot 51", as indicated by the cross-section C-C. The tangential slot 51' in this example has depth corresponding to half of the cross-sectional area of a locking means (see FIGS. 3A, 3B & 5C) with a square cross-section intersecting the shaft 21 at a point where a radius of the shaft 21 intersects the main direction of the tangential locking means.

When mounting a shaft as shown in FIGS. 7B and 7C, it is required to position the shaft in both the axial direction and rotational direction in order to line up the longitudinal and tangential recesses and allow the locking means to be inserted.

In all the above examples, the tangential recess in the form of a groove 51 or a slot 51', 51" in the shaft 21 is a datum point determining the axial projection x (see FIGS. 3A-B) of the shaft 21 relative to the linkage portion 23.

The invention should not be deemed to be limited to the embodiments described above, but rather a number of further variants and modifications are conceivable within the scope of the following patent claims.

The invention claimed is:

1. An implement coupling device on a working machine; the device comprising:
    a coupling means provided with a first shaft;
    an engagement means provided with a second shaft arranged parallel to the first shaft;
    at least one linkage comprising a first portion connected to the first shaft and a second portion connected to the second shaft, which first and second portions are connected by a pivot joint; and
    a wedge means arranged to be removably mounted between the first and second portions, which wedge means is fixed in position to prevent relative movement of the first and second portions when an implement is attached to the coupling device;
    wherein the coupling means and the engagement means are displaceable relative to each other in a direction at right angles to the first and second shaft axes to attach or release the implement;
    wherein at least one of the first and second portions making up the linkage is detachably fixable to its respective shaft by a locking means receivable in a longitudinal recess at right angles to the shaft axis and engagable with a tangential recess in the outer surface of the shaft; and
    wherein the locking means provides a datum point determining an axial projection (x) of the shaft relative to the linkage portion.

2. The implement coupling device according to claim 1, wherein the longitudinal recess is located in the linkage portion, and wherein at least a portion of the locking means intersects with the tangential recess in the outer surface of the shaft.

3. The implement coupling device according to claim 1, wherein at least a third of the cross-sectional area of the locking means intersects the shaft at the point where a radius of the shaft intersects the main direction of the locking means.

4. The implement coupling device according to claim 3, wherein at least half the cross-sectional area of the locking means intersects the shaft.

5. The implement coupling device according to claim 1, wherein the tangential recess is positioned on the shaft such that when the locking means is engaged with the tangential recess, the shaft extends externally away from the respective linkage to form the axial projection (x) of the shaft relative to the linkage portion, the axial projection (x) having a width equal to a width of a cooperating hook of the implement.

6. The implement coupling device according to claim 1, wherein the tangential recess in the outer surface of the shaft comprises a circumferential radial groove in the shaft, and opening in a respective linkage receives the shaft and the respective linkage completely surrounds the shaft.

7. The implement coupling device according to claim 1, wherein the implement coupling device is provided with a pair of linkages each linkage comprising a first portion and a second portion, wherein the first portions each is detachably fixable to the first shaft by respective first locking means, and the second portions each is detachably fixable to the second shaft by respective second locking means, and the first and second locking means are each receivable in respective longitudinal recess of the linkage portions and engageable with axially separated tangential recesses in the outer surface of the first and the second shaft.

8. The implement coupling device according to claim 1, wherein contacting portions of the locking means and the tangential recess have mating shapes.

9. The implement coupling device according to claim 1, wherein both ends of the locking means extend into the linkage portion.

10. The implement coupling device according to claim 1, wherein the locking means is arranged within the outer envelope of the linkage portion adjacent one or both ends of the longitudinal recess.

11. The implement coupling device according to claim 1, wherein the wedge means is provided with a guide means extending in the direction of insertion of the wedge means and/or parallel to the axes of the shafts.

12. The implement coupling device according to claim 11, wherein at least one guide means is provided on one or on both sides of the wedge means.

13. The implement coupling device according to claim 11, wherein the guide means comprises a longitudinal projection or groove.

14. The implement coupling device according to claim 1, wherein each opening receiving a shaft is provided with a radial slot intersecting a corresponding locking means at right angles to the axes of said locking means.

15. A working machine comprising the implement coupling device according to claim 1.

16. An implement coupling device comprising:
a linkage; and
a wedge means arranged to prevent relative movement between a first portion and a second portion of the linkage, the wedge means being removable and insertable into a slot formed by the first portion and the second portion;
wherein the first portion is connected to a first shaft and the second portion is connected to a second shaft; and
wherein the first and second portions are connected by a pivot joint;
wherein the wedge means is provided with a guide means disposed on an outer surface of the wedge means and extending in a direction of insertion of the wedge means, the guide means being configured to ensure that the wedge means is inserted in a predetermined orientation;
wherein the implement coupling device further comprises:
a coupling means provided with a first shaft; and
an engagement means provided with a second shaft arranged parallel to the first shaft;
wherein the coupling means and the engagement means are displaceable relative to each other in a direction at right angles to the first and second shaft axes to attach or release the implement;
wherein at least one of the first and second portions making up the linkage is detachably fixable to its respective shaft by a locking means receivable in a longitudinal recess at right angles to the shaft axis and engagable with a tangential recess in the outer surface of the shaft;
wherein the locking means provides a datum point determining an axial projection of the shaft relative to the linkage portion; and
wherein the wedge means is arranged to be removably mounted between the first and second portions to fix them in position.

17. The implement coupling device with a wedge means according to claim 16, wherein the guide means comprises a profiled section extending in the direction of insertion of the wedge means.

18. The implement coupling device with a wedge means according to claim 16, wherein the guide means comprises a profiled section extending parallel to the axes of the shafts.

19. The implement coupling device with a wedge means according to claim 16, wherein the guide means comprises a profiled section, and the profiled section comprises a longitudinal projection or a longitudinal groove.

* * * * *